United States Patent
Toth et al.

(10) Patent No.: US 6,925,714 B2
(45) Date of Patent: Aug. 9, 2005

(54) UPPER STEERING SHAFT-ASSEMBLY

(75) Inventors: Jeffrey J. Toth, Auburn, MI (US); Michael John Clayton, Saginaw, MI (US); David M. Hitz, Bay City, MI (US); Emanuel Gage, Jr., Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 210 days.

(21) Appl. No.: 10/325,209

(22) Filed: Dec. 19, 2002

(65) Prior Publication Data

US 2004/0118238 A1 Jun. 24, 2004

(51) Int. Cl.$^7$ ............................. B21D 53/88; B62D 1/16; B62D 1/04
(52) U.S. Cl. ........................... 29/897.2; 29/508; 74/492; 74/552
(58) Field of Search .................................... 29/897.2, 508, 29/506, 517, 520; 74/492, 552; 403/359

(56) References Cited

U.S. PATENT DOCUMENTS

| | | | |
|---|---|---|---|
| 4,819,961 A | * | 4/1989 | Henigue ..................... 280/775 |
| 5,761,966 A | | 6/1998 | Cuiller et al. |
| 5,816,112 A | * | 10/1998 | Hosoi et al. ................... 74/552 |
| 5,950,499 A | * | 9/1999 | Hosoi et al. ................... 74/552 |
| 6,076,425 A | * | 6/2000 | Worrell et al. ................ 74/552 |
| 6,134,983 A | | 10/2000 | Armstrong et al. |
| 6,138,525 A | | 10/2000 | Riefe et al. |
| 6,389,924 B1 | | 5/2002 | Ryne et al. |
| 6,435,555 B1 | | 8/2002 | Seamon et al. |
| 6,517,114 B1 | | 2/2003 | Scheib et al. |
| 2001/0039851 A1 | * | 11/2001 | Hosoi et al. ................... 74/552 |

* cited by examiner

Primary Examiner—Marc Jimenez
(74) Attorney, Agent, or Firm—Michael D. Smith

(57) ABSTRACT

An upper steering shaft assembly for a steering column and method of construction therefore having a tubular shaft section and a stub shaft section fabricated separately from one another. The tubular shaft section has a main body portion and a splined portion. The stub shaft section has a shaft portion and a hub engagement portion comprising a splined segment and a tapered portion. A connection end extends axially from the shaft portion of the stub shaft section and is disposed within the main body portion of the tubular shaft section and the tubular shaft section and the stub shaft section are fixedly attached to each other.

10 Claims, 2 Drawing Sheets

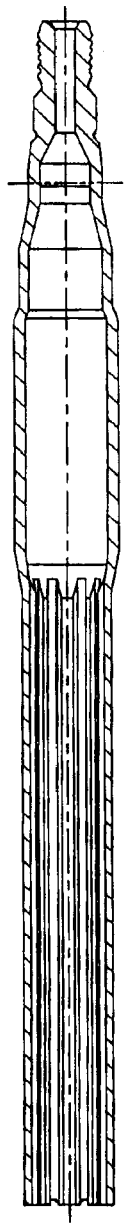
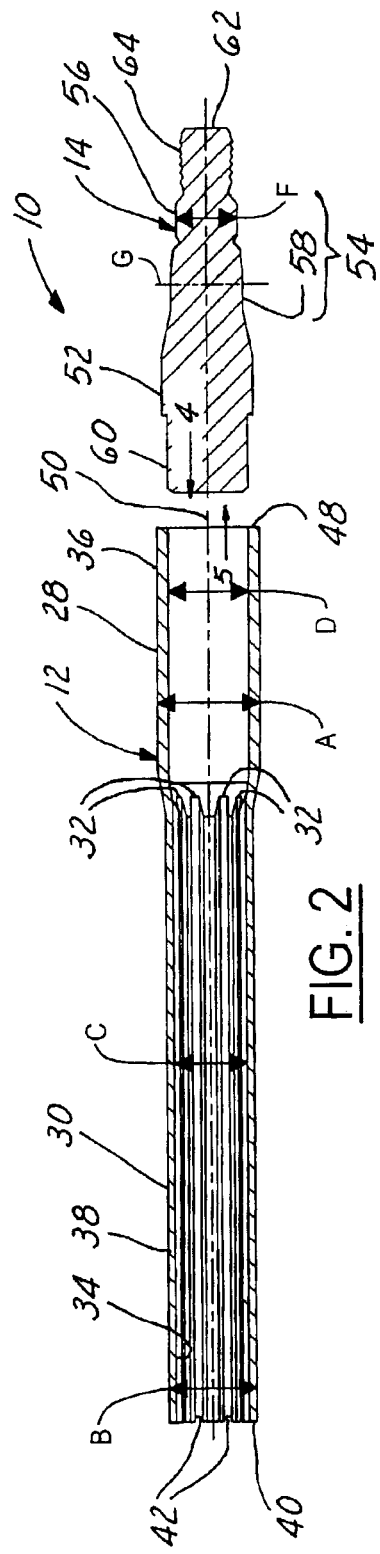
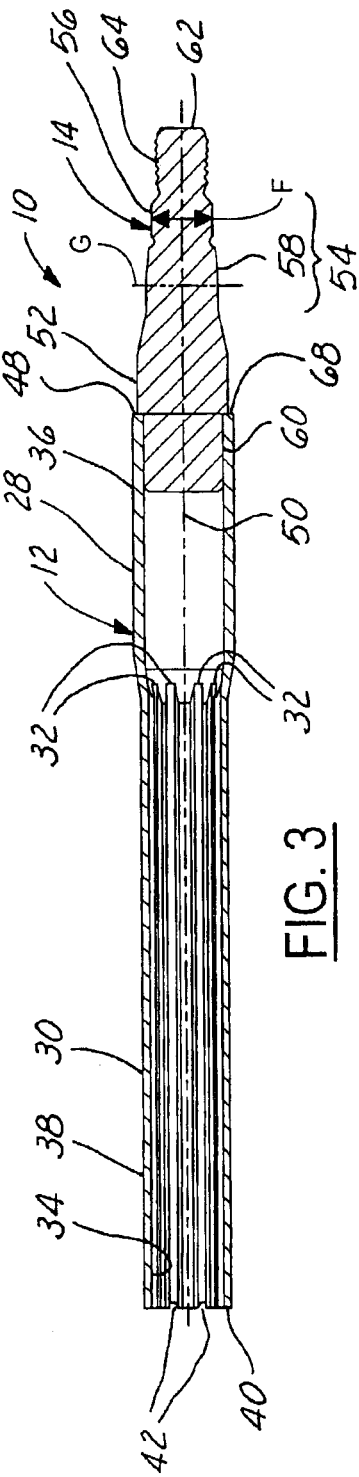
FIG. 1 (Prior Art)
FIG. 2
FIG. 3

UPPER STEERING SHAFT-ASSEMBLY

BACKGROUND OF THE INVENTION

1. Technical Field

The invention relates generally to steering shafts, and more particularly to upper steering shafts for use in automobiles.

2. Related Art

Steering shafts for automobiles typically comprise an upper steering shaft joined to a lower steering shaft for collapsible telescoping movement therebetween. To accommodate the need for collapsible telescoping movement relative to the lower steering shaft, axially traversing splines are commonly formed in the bore of the upper steering shaft. The upper steering shaft is formed to receive a hand wheel such that rotation of the hand wheel causes the upper steering shaft and lower steering shaft to rotate about a longitudinal axis.

The upper steering shaft is commonly formed from a single piece of material, and most commonly by an extrusion process. In order to form the complex, and in some cases critical dimensions of the upper steering shaft, a push-pull extrusion process is typically used to achieve the desired form. The push-pull extrusion process can take anywhere from ten or more steps to create the complex features and dimensions of the upper steering shaft. The relatively high number of steps are required to form the complex dimensions of the upper steering shaft, including the plurality of reductions necessary to accommodate the attachment of the hand wheel to the upper steering shaft and to provide for telescoping movement of the upper steering shaft relative to a lower steering shaft. Though the push-pull extrusion process creates an effective upper steering shaft, the process can prove to be both timely and costly. Additionally, special considerations must be given to producing the wall thicknesses necessary to achieve the torsional strength requirements for the upper steering shaft.

As shown in FIG. 1, an upper steering shaft depicting prior art is shown constructed from a single piece of tubular stock material. The upper steering shaft is formed using a push-pull extrusion process. The push-pull extrusion process provides the ability to produce the plurality of reductions in diameter across the length of the shaft. The upper steering shaft has a threaded end for receiving a nut (not shown) to fasten a hand wheel to the steering shaft. Adjacent the threaded end is a hub engagement portion comprising a tapered portion and a splined segment with an annular recess therebetween. The annular recess region can provide a reduced wall thickness inherent to extruding the complex geometry in this region, thus reducing the torsional strength of the upper steering shaft. Thus, extruding a single piece of material to produce the upper steering shaft having the required torsional strength can prove challenging. Additionally, above and beyond achieving the required torsional strength parameters, the plurality of reductions in diameter across the length of the upper steering shaft provide inherent manufacturing challenges, especially if utilizing an extrusion process. Thus, forming an upper steering shaft from a single piece of tube stock, though capable of producing an effective and reliable component, has proven to be difficult, timely and costly.

SUMMARY OF THE INVENTION

An upper steering shaft assembly for a steering column has a tubular shaft section and a stub shaft section. The tubular shaft section has a main body portion with an outer dimension and a splined portion with an outer dimension. The outer dimension of the main body portion is greater than the outer dimension of the splined portion. The splined portion has an inner surface with a plurality of splines extending radially inwardly therefrom and extending axially along the inner surface. The main body portion has an inner dimension that is greater than the inner dimension of the inner surface.

The stub shaft section has a shaft portion with an outer dimension and a hub engagement portion. The hub engagement portion comprises a splined portion and a tapered portion located between the shaft portion and the splined portion. The splined portion has an outer dimension that is less than the outer dimension of the shaft portion. The stub shaft section is fabricated as a separate piece from the tubular shaft section. The stub shaft section has a connection end with an outer dimension that is less than the outer dimension of the shaft portion. The connection end extends axially from the shaft portion and is disposed within the main body portion of the tubular shaft section to fixedly attach the stub shaft section to the tubular shaft section.

Another aspect of a claimed construction provides a method of constructing an upper steering shaft assembly for a steering column comprising constructing a tubular shaft section having a main body portion with an outer dimension and a splined portion with an outer dimension. The outer dimension of the main body portion is greater than the outer dimension of the splined portion. The splined portion is constructed with an inner surface having a plurality of splines extending radially inwardly and extending axially along the inner surface. The main body portion is constructed having an inner dimension that is great than an inner dimension of the inner surface.

A stub shaft section is constructed separately from the tubular shaft section having a shaft portion with an outer dimension and a hub engagement portion. The hub engagement portion is constructed comprising a spline portion and a tapered portion. The tapered portion is located between the shaft portion and the splined portion. The stub shaft section is constructed having a connection end extending axially from the stub portion with an outer dimension of the connection end being less than the outer dimension of the shaft portion.

The stub shaft section is fixedly attached to the tubular shaft section by disposing the connection end of the stub shaft section within the main body portion of the tubular shaft section.

One advantage offered by the invention is that an upper steering shaft assembly can be constructed using a tubular shaft section having a single reduction fixed to a separately fabricated stub shaft section, thereby improving the ease in which the upper steering shaft assembly may be constructed.

Another advantage offered by the invention is that the cost to produce the upper steering shaft assembly is reduced.

Another advantage offered by the invention is that the stub shaft assembly may be cold formed separately from the tubular shaft section, thereby improving the ease in the manufacture of the upper steering shaft assembly.

Another advantage offered by the invention is that the tubular shaft section may be attached to a variety of stub shaft section configurations, thereby rendering the tubular shaft section universal for a variety of vehicle platforms.

Another advantage offered by the invention is that the stub shaft section provides a stronger component in torsion, thereby improving the torsional strength and integrity of the upper steering shaft assembly.

Another advantage offered by the invention is that higher efficiencies may be recognized in the manufacture of the upper steering shaft assembly, thereby lowering overall costs to produce an upper steering shaft.

BRIEF DESCRIPTION OF THE DRAWINGS

The present invention will now be described, by way of example, with reference to the accompanying drawings, in which:

FIG. 1 is a cross-sectional view taken longitudinally along an axis of an upper steering shaft assembly of a prior art upper steering shaft;

FIG. 2 is an exploded cross-section view taken longitudinally along an axis of an upper steering shaft of a currently preferred embodiment of the invention;

FIG. 3 is an assembled view of the steering shaft assembly from FIG. 2;

DESCRIPTION OF THE PREFERRED EMBODIMENT

Figure 4:
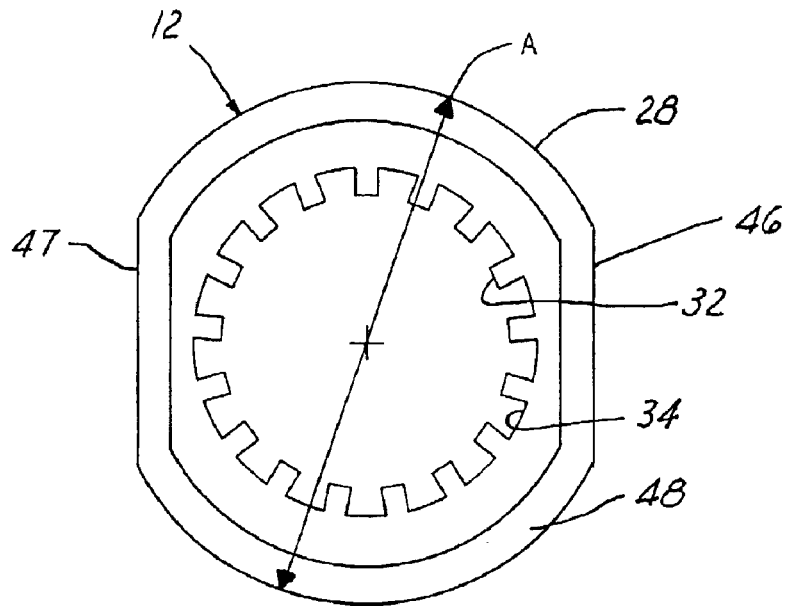
FIG. 4 is an end view looking in the direction of arrow 4 from FIG. 2.

An upper steering shaft assembly constructed according to a presently preferred embodiment of the invention is shown generally at 10 in FIGS. 2–5. Referring initially to FIGS. 2 and 3, the upper steering shaft assembly 10 includes a tubular shaft section 12 fixedly attached to a separately formed stub shaft section 14. The tubular shaft section 12 comprises a generally cylindrical tube having only one reduction in diameter along its length, thereby making the tubular shaft section 12 relatively easy to produce using an extrusion process. The stub shaft section 14 comprises a solid piece of generally cylindrical material having a plurality of reductions in diameter across its length. By separately constructing the stub shaft section 14 from the tubular shaft section 12, the tubular shaft section 12 can be readily extruded, while the stub shaft section 14 can be readily formed by machining or the like.

As best shown in FIG. 2, the tubular shaft section 12 is preferably fabricated from generally cylindrical tube stock by an extrusion process. A main body portion 28 of the tubular shaft section 12 has an outer dimension represented as a diameter A and a separate splined portion 30 has an outer dimension represented as a diameter B. The outer diameter B of the splined portion 30 is less than the outer diameter A of the main body portion 28.

Prior to extruding the tubular shaft section 12, the generally cylindrical tube stock has a diameter that corresponds to the diameter A of the main body portion 28. During the extrusion process, the outer diameter B of the splined portion 30 is compressed inwardly about a mandrel (not shown) to form a plurality of splines 32 axially along an inner surface 34 of the splined portion 30. The material from the wall of the tube stock is compressed into radially spaced and axially extending grooves within the mandrel to plastically deform the inner surface 34 of the wall of the tube stock into the grooves, thereby forming the splines 32. Since the overall material content of the tube stock is conserved, the main body portion 28 has a main wall 36 with a defined thickness and the splined portion 30 has a splined wall 38 having a defined thickness that is less than the thickness of the main wall 36. Also, as a result of the conservation of material, an end 40 of the splined portion 30 has dimples 42 formed therein between each inwardly extending spline 32. This results from axial outward distortion of the material at each spline 32, while the material between each spline 32 remains in place.

As a result of forming the splines 32, the inner surface 34 of the splined portion 30 has a dimension represented as a diameter C that is less than a dimension of an inner surface 44 of the main body portion 28 represented as diameter D.

It is important to control the thickness of the main wall 36 of the main body portion 28 in order for the portion 28 to withstand a predetermined amount of applied torque while in use. Constructing the tubular shaft section 12 by the extrusion process allows for the needed control of the wall thickness.

As shown in FIG. 4, at least one flat surface and preferably a pair of opposing flat surfaces 46,47 are formed in an end 48 of the tubular shaft section 12. The flat surfaces 46,47 extend axially from the end 48 for a predetermined length and interrupt the cylindrical shape of the main body portion 28 to assist in preventing rotation of the stub shaft section 14 relative to the tubular shaft section 12 about a longitudinal axis 50 in operation.

The stub shaft section 14 is preferably constructed as a solid component by cold heading, forging, molding, machining, or the like. It should be recognized that while the stub shaft section 14 is shown as a solid component, the stub shaft section 14 could be formed having cavities or openings as needed, though this is not shown here. What is important is that it be separately formed from the tubular shaft section 12 to avoid using the prior push-pull extrusion process to make the assembly. The stub shaft section 14 is constructed having a shaft portion 52 for receiving an inner race of a bearing (not shown) and a hub engagement portion 54 for receiving a hub of a hand wheel (not shown). The hub engagement portion 54 comprises a splined segment 56 and a tapered portion 58, wherein the tapered portion 58 is located between the shaft portion 52 and the splined segment 56. The splined segment 56 acts to prevent rotation of the hand wheel relative to the stub shaft section 14, while the tapered portion 58 acts to locate the hand wheel axially relative to the stub shaft section 14. An end 62 adjacent the splined segment 56 has threads 64 preferably formed adjacent to the splined segment 56 for receiving a nut (not shown) to facilitate the attachment of the hand wheel (not shown) to the upper steering shaft assembly 10.

Figure 5:
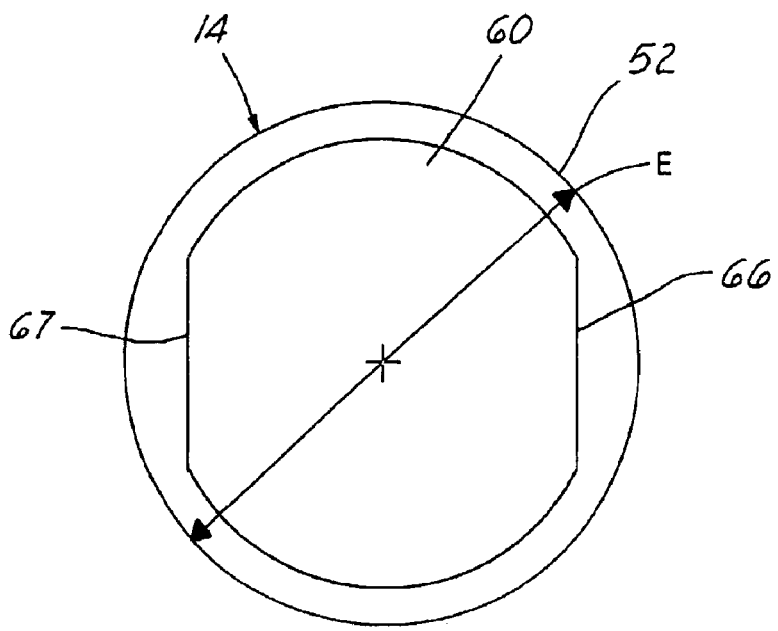
FIG. 5 is an end view looking in the direction of arrow 5 from FIG. 2.

The stub shaft section 14 has a connection end 60 opposite the end 62. The connection end 60 is formed adjacent the shaft portion 52 and extends axially and concentrically from the shaft portion 52. As best shown in FIG. 5, the connection end 60 is preferably formed having at least one generally flat surface and preferably a pair of opposite generally flat surfaces 66, 67. The flat surfaces 66, 67 interrupt the generally cylindrical shape of the connection end 60 for mating engagement with the flat surfaces 46, 47 of the main body portion 28 during assembly.

The shaft portion 52 is constructed having an outer dimension represented here as a diameter E and the splined segment 56 is constructed having an outer dimension represented as a diameter F, wherein the diameter F of the splined segment 56 is less than the diameter E of the shaft portion 52. The tapered portion 58 between the splined segment 56 and the shaft portion 52 has a gauge diameter G that ensures proper engagement and seating between the hub of the hand wheel and the stub shaft section to properly locate the hand wheel relative to the stub shaft section 14. The gauge diameter G is larger than the diameter F of the splined segment 56, but smaller than the diameter E of the shaft portion 52.

The ability to form the stub shaft section 14 separately from the tubular shaft section 12 allows for the construction of a rigid and torsionally strong stub shaft section 14. Even in areas having a reduced cross-sectional diameters, such as the area between the splined segment 56 and the tapered portion 58, sufficient torsional strength is maintained. Overall, it should be recognized that given the same material, the torsional strength of a solid component is generally greater than the torsional strength of a tubular component.

To assemble the components, the connection end 60 of the stub shaft section 14 is axially disposed within the main body portion 28 of the tubular shaft section 12. The flat surfaces 46, 47, 66, 67 on each the tubular shaft section 12 and the stub shaft section 14 are aligned relative to each other for mating engagement and provide a mechanism for preventing rotation of the stub shaft section 14 relative to the tube shaft section 12. The end 48 of the main body portion 28 abuts the shaft portion 52 to define a shoulder 68. The shoulder 68 acts to locate the bearing (not shown) on the shaft portion 52 of the stub shaft section 14.

Upon disposal of the connection end 60 within the main body portion 28, preferably the two sections 12, 14 are welded together using a MIG weld, TIG weld, friction weld, resistance weld, brazing, adhesive, or the like to fixedly attach the two sections 12, 14 to each other. To assist in reducing hardening or martenizing of material that may result in the weld zone, at least a portion of the stub shaft section 14 and/or at least a portion of the tubular shaft section 12 may be preheated prior to the welding process. In addition, the weld zone may be tempered afterwards. It should be recognized that the connection end 60 of the stub shaft section 14 can be constructed having a diameter to produce an interference fit within the main body portion 28 of the tubular shaft section 12, thereby eliminating or reducing the need to have a weld between the two sections 12, 14. It should also be recognized that mechanisms other than welding, such as doweling may be used to fixedly attach the sections 12, 14 to each other.

Upon fixedly attaching the stub shaft section 14 to the tubular shaft section 12, additional machining may be performed on the assembly as needed to achieve final dimensions. In particular, the dimensions on the stub shaft section 14, such as the different diameters or the required concentricity between the stub shaft section 14 and the tubular shaft section 12, may be more readily obtained by machining the sections 12, 14 after fixedly attaching the section 12, 14 to each other.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of constructing an upper steering shaft assembly for a steering column, comprising:

preparing a tubular shaft section having a main body portion with an outer dimension and a splined portion with an outer dimension, said outer dimension of said main body portion being greater than said outer dimension of said splined portion, said splined portion having an inner surface with a plurality of splines extending radially inwardly therefrom and extending axially along said inner surface, said main body portion having an inner dimension that is greater than said inner dimension of said inner surface;

preparing a stub shaft section separately from said tubular shaft section having a shaft portion with an outer dimension and a hub engagement portion, said hub engagement portion comprising a splined segment and a tapered portion located between said shaft portion and said splined segment and said stub shaft section having a connection end extending axially from said shaft portion with an outer dimension of the connection end being less than said outer dimension of said shaft portion;

fixedly attaching said stub shaft section to said tubular shaft section by disposing said connection end of said stub shaft section within said main body portion of said tubular shaft section, and welding the stub shaft section to the tubular shaft section after disposing the connection end within the main body portion.

2. The method of constructing an upper steering shaft assembly for a steering column of claim 1 wherein the welding step comprises friction welding.

3. The method of constructing an upper steering shaft assembly for a steering column of claim 1 wherein the welding step comprises MIG welding.

4. The method of constructing an upper steering shaft assembly for a steering column of claim 1 wherein the welding step comprises resistance welding.

5. The method of constructing an upper steering shaft assembly for a steering column of claim 1 wherein the connection end of the stub shaft section is disposed in the main body portion with an interference fit resulting between the connection end and the main body portion.

6. The method of constructing an upper steering shaft assembly for a steering column of claim 1 wherein the stub shaft section is constructed as a solid piece of material.

7. The method of constructing an upper steering shaft assembly for a steering column of claim 1 wherein the main body portion of the tubular shaft section is constructed having a main wall with a thickness and the splined portion is constructed having a splined wall extending from the main wall, said splined wall having a thickness that is less than said thickness of said main wall.

8. The method of constructing an upper steering shaft assembly for a steering column of claim 1 further comprising preheating at least a portion of the stub shaft section prior to the welding step.

9. The method of constructing an upper steering shaft assembly for a steering column of claim 1 further comprising preheating at least a portion of the tubular shaft section prior to the welding step.

10. The method of constructing an upper steering shaft assembly for a steering column of claim 1 further comprising tempering at least a portion of the upper steering shaft assembly after the welding step.

\* \* \* \* \*